United States Patent
Liu et al.

(10) Patent No.: US 7,664,462 B2
(45) Date of Patent: Feb. 16, 2010

(54) RECOVERY SYSTEM WITH DE-QUEUE LOGIC

(75) Inventors: George Xiangling Liu, Stoughton, MA (US); James A. Justice, Waltham, MA (US)

(73) Assignee: Lojack Operating Company LP, Westwood, MA (US)

( * ) Notice: Subject to any disclaimer, the term of this patent is extended or adjusted under 35 U.S.C. 154(b) by 714 days.

(21) Appl. No.: 11/438,586

(22) Filed: May 22, 2006

(65) Prior Publication Data

US 2007/0066219 A1 Mar. 22, 2007

Related U.S. Application Data (63) Continuation-in-part of application No. 11/229,736, filed on Sep. 19, 2005.

(51) Int. Cl.
*H04B 5/00* (2006.01)
(52) U.S. Cl. .................. 455/41.1; 455/412.2; 455/11.1; 455/419
(58) Field of Classification Search .............. 455/7, 455/14, 414.2, 412.2, 418, 419, 15, 569.2, 455/41.1, 557, 3.01, 3.05, 404.1, 434, 9, 455/11.1, 41.2; 340/506, 573.1, 993
See application file for complete search history.

(56) References Cited

U.S. PATENT DOCUMENTS

| 4,177,466 | A | 12/1979 | Reagan |
| 4,818,988 | A | 4/1989 | Cooperman et al. |
| 4,908,609 | A | 3/1990 | Stroomer |
| 4,978,946 | A * | 12/1990 | Nordholm et al. ........ 340/573.1 |
| 5,631,642 | A * | 5/1997 | Brockelsby et al. ......... 340/993 |
| 5,704,008 | A | 12/1997 | Duvall, Jr. |
| 5,917,423 | A | 6/1999 | Duvall |
| 6,229,988 | B1 | 5/2001 | Stapefeld et al. |
| 6,522,698 | B1 | 2/2003 | Irving et al. |
| 6,665,613 | B2 | 12/2003 | Duvall |
| 2003/0206117 | A1* | 11/2003 | Rosenberg et al. ....... 340/932.2 |
| 2007/0040668 | A1 | 2/2007 | Krishna et al. |
| 2007/0066218 | A1 | 3/2007 | Justice et al. |

* cited by examiner

*Primary Examiner*—John Lee
(74) *Attorney, Agent, or Firm*—Iandiorio Teska & Coleman (57) ABSTRACT

A recovery system with repeating communication capabilities. The system includes a station configured to send an activation message, at least a first "primary" remote transmitting unit responsive to the station and configured to transmit the activation message and at least a one "secondary" remote transmitting unit. That unit includes a receiver which receives the activation message, a transmitter for transmitting the activation message, and a controller responsive to the receiver and controlling the transmitter. The controller is programmed to transmit the activation message and then automatically stop transmission of the activation message after a predetermined time period unless the activation message is again received.

17 Claims, 10 Drawing Sheets

RECOVERY SYSTEM WITH DE-QUEUE LOGIC

RELATED APPLICATIONS

This application is a continuation-in-part patent application of U.S. patent application Ser. No. 11/229,736, filed Sep. 19, 2005, entitled "Recovery System With Repeating Communication Capabilities".

FIELD OF THE INVENTION

This invention relates primarily to stolen vehicle recovery systems but also relates to other types of recovery and communicating systems.

BACKGROUND OF THE INVENTION

The applicant's successful and popular vehicle recovery system sold under the trademark LoJack® includes a small electronic vehicle locating unit (VLU) with a transponder hidden within a vehicle, a private network of communication towers each with a remote transmitting unit (RTU), one or more law enforcement vehicles equipped with a vehicle tracking unit (VTU), and a network center with a database of customers who have purchased a VLU. The network center interfaces with the National Crime Information Center. The entries of that database comprise the VIN number of the customer's vehicle and an identification code assigned to the customer's VLU.

When a LoJack® product customer reports that her vehicle has been stolen, the VIN number of the vehicle is reported to a law enforcement center for entry into a database of stolen vehicles. The network center includes software that interfaces with the database of the law enforcement center to compare the VIN number of the stolen vehicle with the database of the network center which includes VIN numbers corresponding to VLU identification codes. When there is a match between a VIN number of a stolen vehicle and a VLU identification code, as would be the case when the stolen vehicle is equipped with a VLU, and when the center has acknowledged the vehicle has been stolen, the network center communicates with some of the RTUs of the various communication towers (currently there are 130 nationwide) and each tower transmits an activation message to activate the transponder of the particular VLU bearing the identification code.

The transponder of the VLU in the stolen vehicle is thus activated and begins transmitting the unique VLU identification code via a VLU transponder code message. The VTU of any law enforcement vehicles proximate the stolen vehicle receive this VLU transponder code and, based on signal strength and directional information, the appropriate law enforcement vehicle can take active steps to recover the stolen vehicle. See, for example, U.S. Pat. Nos. 4,177,466; 4,818,988; 4,908,609; 5,704,008; 5,917,423; 6,229,988; 6,522,698; and 6,665,613 all incorporated herein by this reference. Other messages can also be sent by the center and the towers.

Typically, there are two telephone lines interconnecting each RTU to the center. If a stolen vehicle is suspected of being located in the New England area where there are 21 towers each with an RTU, 21 telephone calls would be made so that each RTU begins to transmit a message which, if received by the VLU in the stolen vehicle, activates the VLU transponder so law enforcement personnel can then locate the stolen vehicle using a VTU.

Calling each RTU therefore takes time wherein a thief can attempt to thwart recovery efforts. Calling each RTU also incurs costs. Finally, in the case where there is a problem with an RTU land line connection with the center, that RTU will not begin transmitting the message required to activate the VLU in the stolen vehicle.

SUMMARY OF THE INVENTION

It is therefore an object of this invention to provide a recovery system and method in which the time required to activate a VLU in a stolen vehicle is reduced.

It is a further object of this invention to provide such a system and method which is less costly.

It is a further object of this invention to provide such a system and method which is more reliable.

The subject invention results from the realization that a faster, less costly, and more reliable vehicle recovery system is accomplished not by the center calling each RTU but instead by the center calling one or only a few designated "primary" RTUs and the other "secondary" RTUs being programmed to listen for messages transmitted by the called RTUs so the non-called RTUs can then send the appropriate message to the VLU in a stolen vehicle but only for a predetermined time period after which the non-called RTUs cease their transmissions unless they again receive the appropriate message.

The subject invention, however, in other embodiments, need not achieve all these objectives and the claims hereof should not be limited to structures or methods capable of achieving these objectives.

This invention features recovery system with repeating communication capabilities. One typical system includes a station configured to send an activation message, at least a first "primary" remote transmitting unit responsive to the station and configured to transmit the activation message, and at least a one "secondary" remote transmitting unit. That unit includes a receiver which receives the activation message, and a transmitter for transmitting the activation message. A controller is responsive to the receiver, controls the transmitter, and is programmed to transmit the activation message and then stop transmission of the activation message after a predetermined time period unless the activation message is again received by the receiver. In this way, transmissions cease after a predetermined time period to clear the airwaves of unnecessary transmissions.

A typical locating unit is configured to transmit an activation acknowledgement message in response to the activation message. The station is then configured, in response to the acknowledgement message, to transmit a de-queue message. The first remote transmitting unit, in response to the de-queue message, is configured to cease transmission of the activation message and then, after the predetermined time period, the second remote transmitting unit automatically ceases transmission of the activation message.

In one example, the first remote transmitting unit includes a land line connection to the station for receiving the activation message and the first remote transmitting unit includes an RF transmitter for sending the activation message to the receiver of the second remote transmitting unit. Preferably, the controller thereof is programmed to ignore a message received by the receiver below a predetermined signal strength. Typically, there are N or many secondary remote transmitting units each including a receiver which receives messages, a controller which processes those messages, and a transmitter which transmits the messages. Typically, there are only a few or M primary remote transmitting units. In the applicant's LoJack® vehicle recovery system, the activation message is typically a transponder activation message.

A recovery system in accordance with the subject invention features a vehicle locating unit including a receiver, a controller responsive to the receiver, a transponder activated by the controller in response to a transponder activation message received by the receiver, and a transmitter controlled by the controller for transmitting an acknowledgement message in response to transponder activation. A station is configured to send the transponder activation message in response to a theft event and a de-queue message in response to receipt of the acknowledgement message. At least a first remote transmitting unit is responsive to the central station and is configured to transmit the transponder activation message until the de-queue message is received from the station. At least a second remote transmitting unit includes a receiver which receives the transponder activation message from the first remote transmitting unit, a transmitter, and a controller responsive to the receiver, and configured to control the transmitter to transmit the transponder activation message and then stop transmission of the transponder activation message after a predetermined time period unless the activation message is again received by the receiver.

In one embodiment, a vehicle recovery system includes a vehicle locating unit configured to process an activation message and transmit an acknowledgement message in response, a station configured to send the activation message in response to a theft event and a de-queue message in response to receipt of the acknowledgement message, at least a first remote transmitting unit responsive to the station and configured to transmit the activation message until the De-queue message is received from the station, and at least a second remote transmitting unit configured to receive the activation message from the first remote transmitting unit and to re-transmit the activation message but only for a predetermined time period unless the activation message is again received from the first remote transmitting unit.

A recovery method in accordance with this invention features transmitting an activation message to at least a first remote transmitting unit. The first remote transmitting unit transmits the activation message in response and a second remote transmitting unit receives the activation message from the first remote transmitting unit and, in response, transmits the activation message but only for a predetermined time period unless an activation message is again received. In one example, the first remote transmitting unit includes a land line connection to a station for receiving the activation message and transmissions from the first remote transmitting unit and the second remote transmitting unit are wireless. When employed in connection with the applicant's, LoJack® vehicle recovery system, activation message is typically a transponder activation message.

The subject invention also features a transmission scheduling method for a recovery system including at least one vehicle locating unit, a station, at least a first remote transmitting unit responsive to the station, and at least one second remote transmitting unit responsive to the first remote transmitting unit, all configured to receive, process, and transmit messages. In the vehicle locating unit, an activation message received is processed and an acknowledgement message is transmitted in response. In the station, the activation message is sent in response to a theft event and a de-queue message is sent in response to receipt of the acknowledgement message. In the first remote transmitting unit, the activation message is sent in response to receipt of the activation message from the station until the de-queue message is received from the station. In the second remote transmitting unit, the activation message is received from the first remote transmitting unit and the activation message is re-transmitted but only for a predetermined time period unless the activation message is again received—typically from the first remote transmitting unit.

BRIEF DESCRIPTION OF THE DRAWINGS

Other objects, features and advantages will occur to those skilled in the art from the following description of a preferred embodiment and the accompanying drawings, in which.

DISCLOSURE OF THE PREFERRED EMBODIMENT

Aside from the preferred embodiment or embodiments disclosed below, this invention is capable of other embodiments and of being practiced or being carried out in various ways. Thus, it is to be understood that the invention is not limited in its application to the details of construction and the arrangements of components set forth in the following description or illustrated in the drawings. If only one embodiment is described herein, the claims hereof are not to be limited to that embodiment. Moreover, the claims hereof are not to be read restrictively unless there is clear and convincing evidence manifesting a certain exclusion, restriction, or disclaimer.

Figure 1:
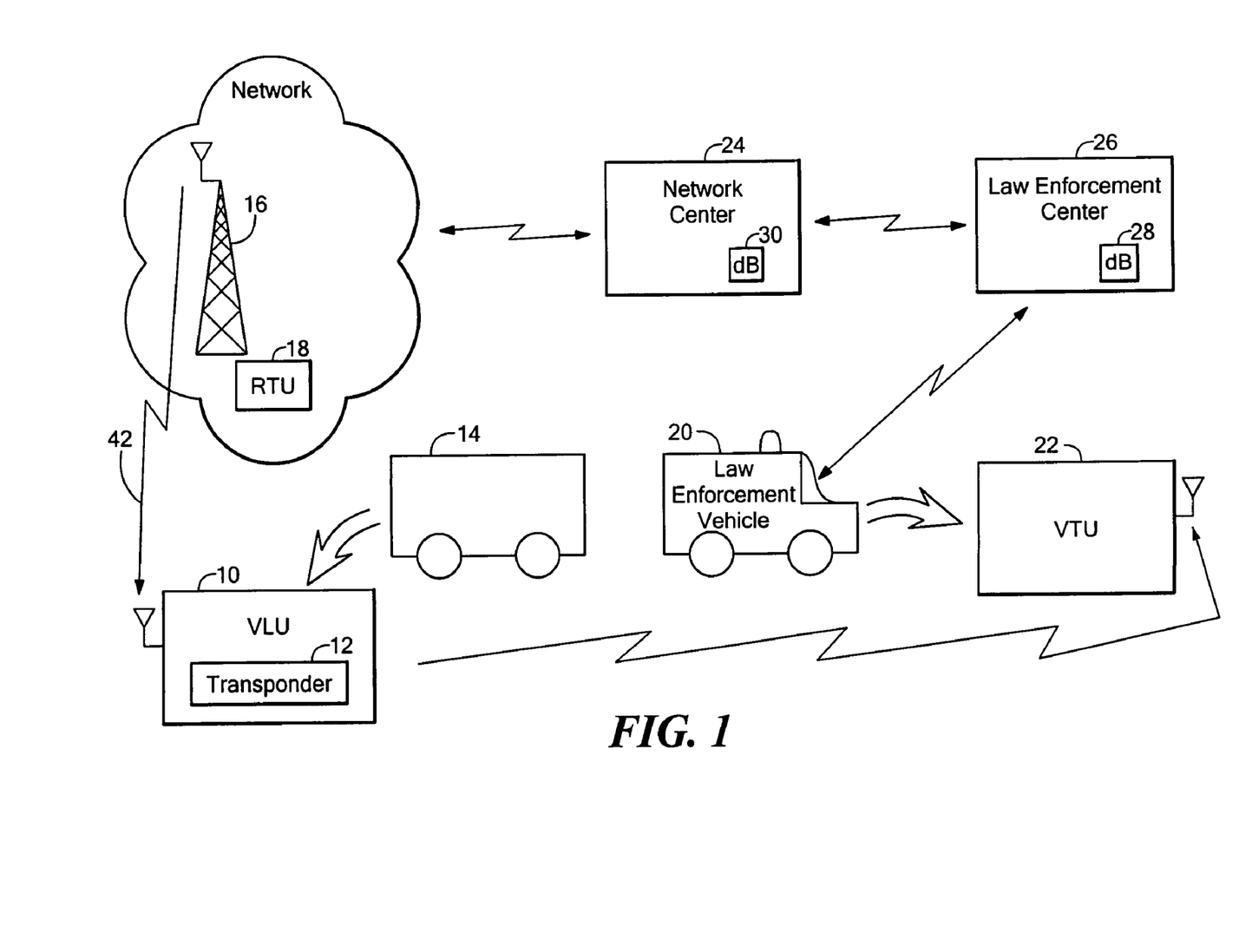
FIG. 1 is a schematic block diagram showing a typical vehicle recovery system in accordance with the subject invention.

As discussed in the background section above, the applicant's successful and popular vehicle recovery system sold under the trademark LoJack® includes a small electronic vehicle locating unit (VLU) 10, FIG. 1 with a transponder 12 hidden within a vehicle 14, a private network of communication towers 16 each with a remote transmitting unit (RTU) 18, one or more law enforcement vehicles 20 equipped with a vehicle tracking unit (VTU) 22, and network center 24.

When a LoJack® product customer reports that her vehicle has been stolen, the VIN number of the vehicle is reported to law enforcement center 26 for entry into database 28 of stolen vehicles. Network center 24 includes software that interfaces with database 28 of law enforcement center 26 to compare the VIN number of the stolen vehicle with database 30 of network center 24 which includes VIN numbers corresponding to VLU identification codes. When there is a match between a VIN number of a stolen vehicle and a VLU identification code, as would be the case when stolen vehicle 14 is equipped with VLU 10, network center 24 communicates with the RTUs 18 of the various communication towers 16 and each tower then transmits an activation message to activate transponder 12 of VLU 10 bearing the particular identification code.

Transponder 12 of VLU 10 in stolen vehicle 14, once activated, begins transmitting a unique VLU identification code. VTU 22 of law enforcement vehicle 20 proximate stolen vehicle 14 receives this VLU transponder code and, based on signal strength and directional information, the appropriate law enforcement vehicle can take active steps to recover stolen vehicle 14. Other messages can also be sent by the center and the RTUs.

Figure 2:
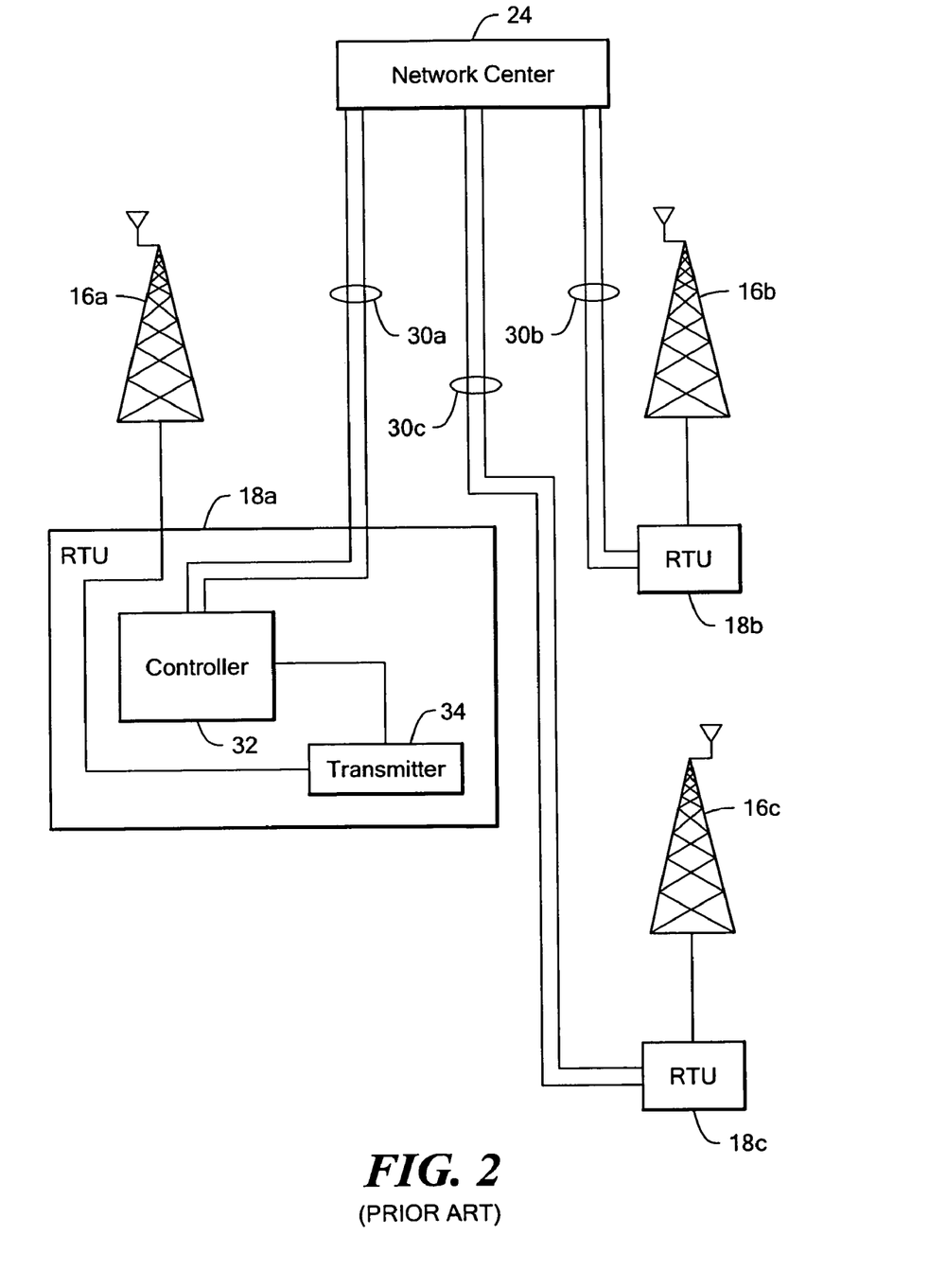
FIG. 2 is a schematic block diagram showing the primary components associated with a remote transmitting unit and tower combination in accordance with the applicant's own prior art.

As shown in FIG. 2, each remote transmitting unit (RTU) 18a, 18b, and 18c includes a land line connection or connections 30a-30c to center 24. Typically, there are two telephone lines between each RTU and the center for reliability purposes. When the controller 32 of RTU 18a receives a message from center 24 that a particular vehicle locating unit (VLU) is to be activated, controller 32 activates RF transmitter 34 to send the appropriate message wirelessly to the VLU as shown in FIG. 1. Each RTU 18b, 18c, and the like is configured the same (and includes other electronic circuitry and hardware such as a GPS receiver for establishing a time reference—not shown for clarity) and thus each RTU is called by center 24 via a land line and begins transmitting an activation message wirelessly to the VLU. In response to this message, the VLU transponder is activated and law enforcement personnel, using a VTU, can track and locate the VLU-equipped vehicle or other object of value equipped with a VLU.

In the New England area, for example, there are 21 towers each with an RTU and so center 24 would make 21 telephone calls so that all 21 RTUs begin transmitting a transponder activation message to the VLU of a vehicle as delineated in the Background section above. This prior configuration and method can result in a delay during which a thief can attempt to thwart recovery efforts. Calling each RTU also incurs costs. Finally, in the case where there is a problem with an RTU's land line connection, that RTU will not begin transmitting the message required to activate the VLU.

Figure 3:
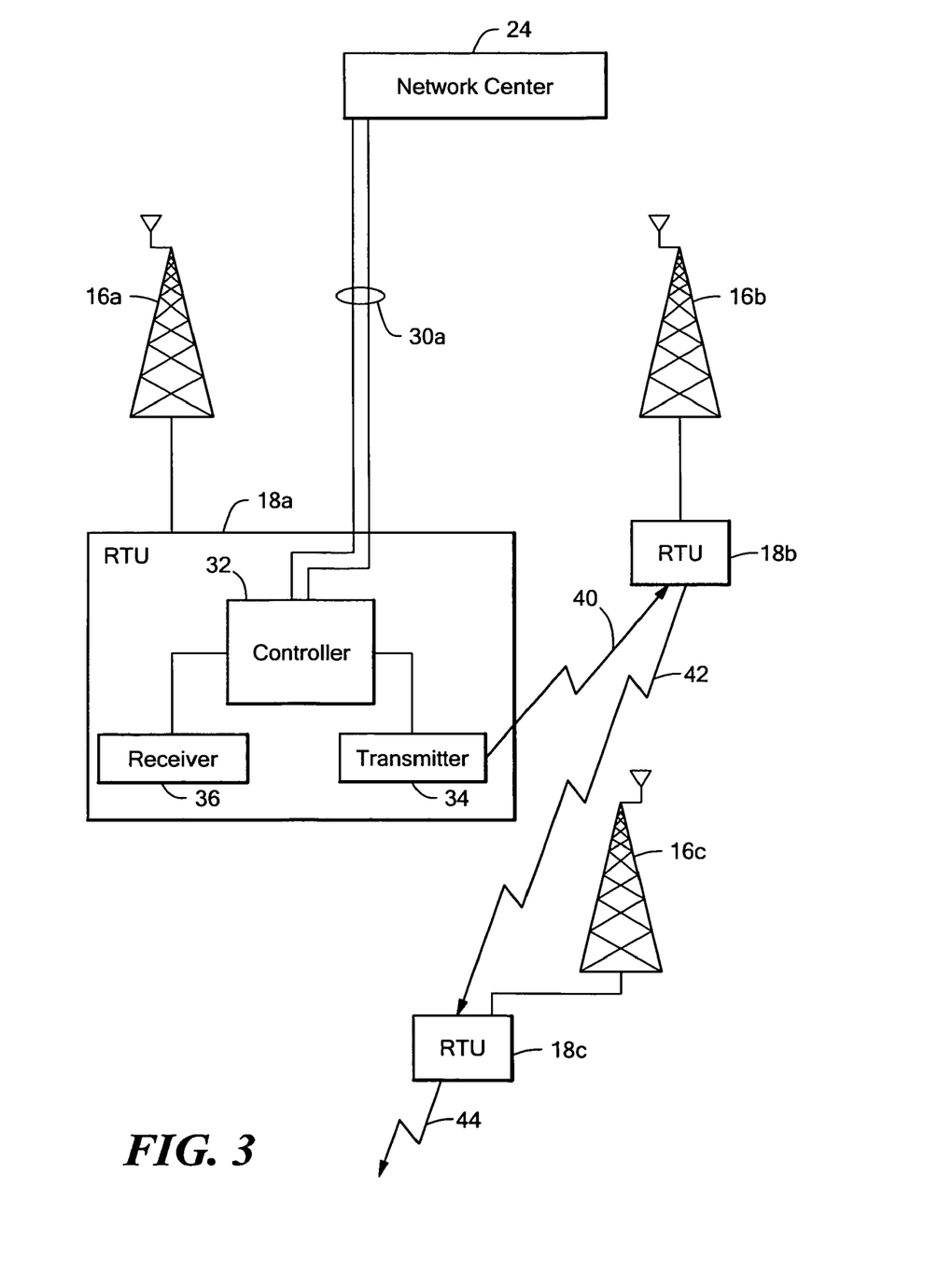
FIG. 3 is a schematic block diagram showing the primary components associated with a remote transmitting unit in accordance with the subject invention.

The subject invention results in a faster, less costly, and more reliable recovery system for vehicles and other objects of value. As shown in the example of FIG. 3, RTU 18a is still connected to center 24 via land line 30a. RTUs 18b and 18c may also be connected to center 24 by a land line (not shown) but such a connection is not necessary. Instead, each or select RTUs 18 now includes a RF receiver 36 in addition to RF transmitter 34 (or transceiver) controlled by controller 32. The controller 32 of each RTU is programmed to listen, via its respective receiver, for messages transmitted by all other or select, designated, RTUs. In this way, for example, center 24 need only call RTU 18a which receives the message from center 24 via land line 30a. RTU 18a then begins to wirelessly transmit a message as shown at 40 to a particular VLU in order to activate that VLU's transponder. RTU 18b, in turn, also receives the message transmitted by RTU 18a. The controller of RTU 18b then processes that message and causes the transmitter of RTU 18b to transmit a message as shown at 42 which will also activate the transponder of the VLU. That message 42, in turn is received by the receiver of RTU 18c which, in response, also transmits a message which will activate the transponder of the VLU and possibly cause other RTUs, not shown, to begin transmitting messages to the VLU.

The end result of this configuration is the same as for the configuration of FIG. 2: all the RTUs transmit a message which will activate the transponder in a stolen vehicle equipped with a VLU. But, in the configuration of FIG. 2, all the RTUs had to be called by center 24 while, in contrast, in the configuration of FIG. 3 only one RTU had to be called by the center. The result is a time and cost savings and added reliability when, for example, there is a problem with the land line connection between a RTU and the center.

Figure 4:
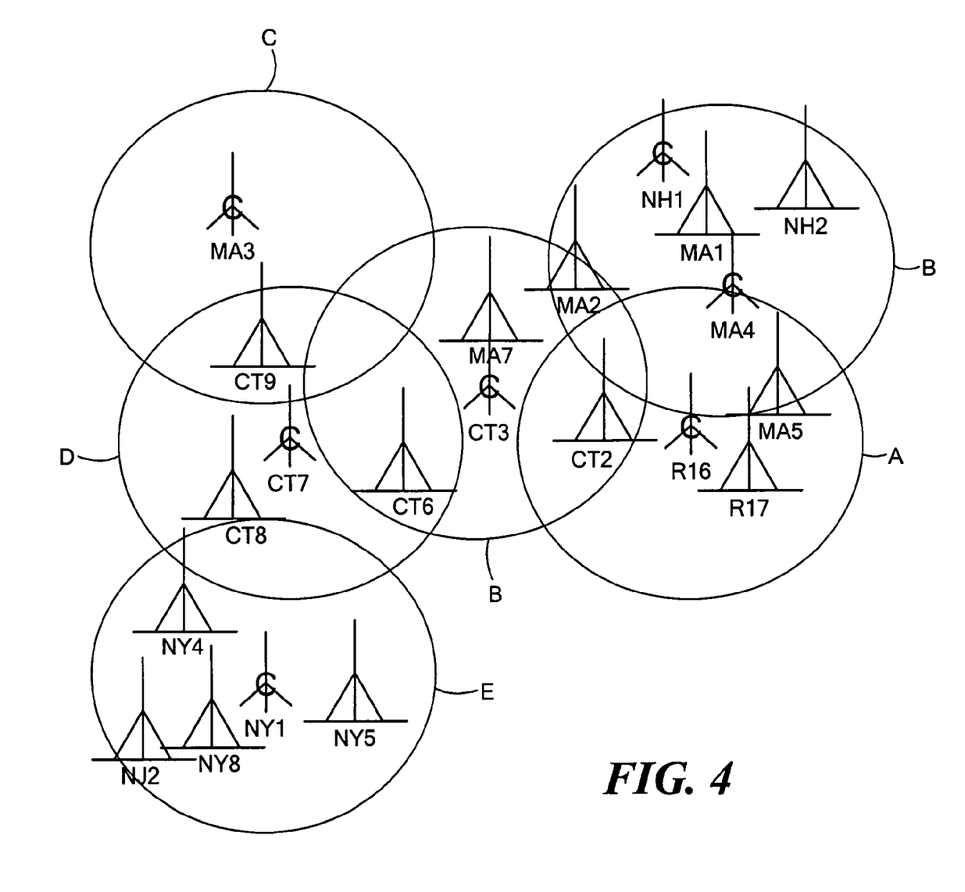
FIG. 4 is a schematic diagram showing an example of a recovery system and method with repeating communication capabilities in accordance with the subject invention.

In the example of FIG. 4, one eastern U.S. network includes 21 RTU/tower combinations as shown each labeled by state, given a number, and associated geographically by cells A-E. Cell A thus includes two tower/RTU combinations located in New Hampshire (NH1 and NH2) and three tower/RTU combinations located in Massachusetts (MA1, MA2, and MA4). A particular tower/RTU combination may be a part of two or more cells as shown. The tower/RTU combinations with a "C" designation are the "called" towers (they receive a message from the center via a land line); the tower/RTU combinations without a "C" designation, in contrast, receive that same message wirelessly from other proximate tower/RTU combinations as discussed with reference to FIG. 3. Note there are fewer called RTUs than non-called RTUs. These are examples only, however, as the designation of which tower/RTU combinations are called by the center and which receive their messages wirelessly from other tower/RTU combinations depends on many factors.

It is convenient to designate the messages sent from a station to a called tower/RTU combination the "first" message, and the message those called tower/RTU combinations transmit wirelessly to a VLU the "second" message. The first message can take different forms. When the first message is intended to activate the transponder of a VLU, it will include a code representing the identifier of the particular VLU and a code which initiates the VLU to activate its transponder to transmit a signal. A typical RTU controller is programmed to then generate the second message to include both of these codes and to repeat that transmission periodically for a predetermined time period. The non-called RTUs receive this second message wirelessly and transmit, periodically, for a predetermined time (e.g., one day), the same basic message deemed herein a "third" message. Therefore, the so-called first, second, and third messages may include the same basic information: the VLU identifier and a code which causes the transponder of the VLU to begin transmitting.

Messages other than the VLU transponder activation message include codes which adjust the transmission schedule of the VLU transponder or deactivate the VLU transponder. Other messages between the center and the called RTUs and between the called RTUs and the RTUs which receive information wirelessly are possible.

To ensure corrupted messages are not re-broadcast or propagated by the network, the controller of each non-called RTU is preferably programmed to transmit a message to a VLU only if that RTU receives, wirelessly, the same message twice from another called RTU after the expiration of a wait period (e.g., 60 seconds). Also, the controller of each non-called RTU is preferably programmed to ignore messages received which fall below a predetermined signal strength. The controller is typically implemented in a computer. The center "station" may comprise computers in more than one location although these are not necessary limitations of the subject invention.

In whatever configuration, this method of implementing a recovery system shortens the time required to activate the VLU in a stolen vehicle. The system and method of this invention whereby only one or select number of RTUs are called by the center via a land line results is less costly and more reliable. Instead of having the center call each RTU, select RTUs are programmed to listen for messages transmitted wirelessly by the called RTUs so these non-called RTUs can then send the appropriate message to a VLU.

Figure 5:
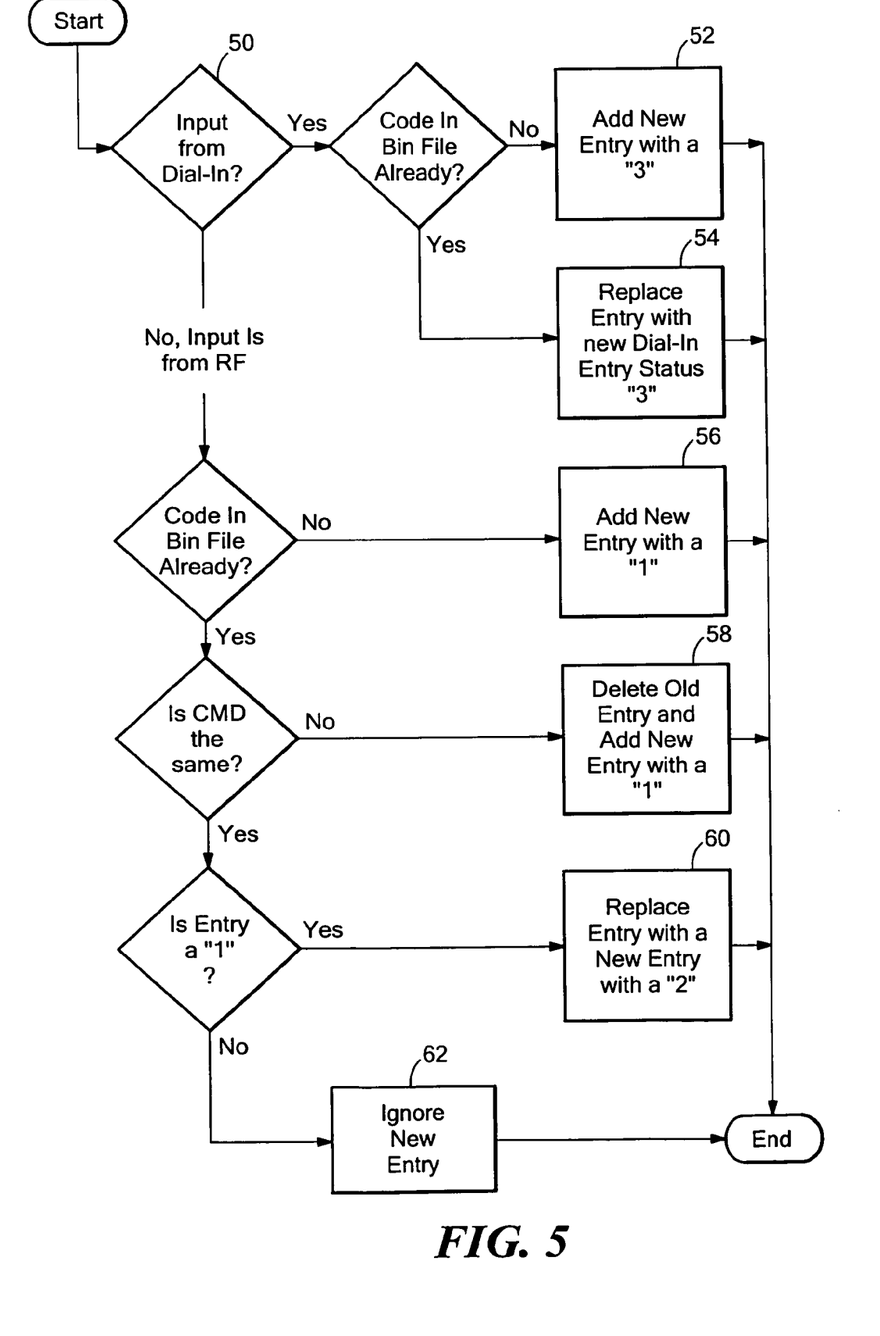
FIG. 5 is logic flow diagram for the previous programming of a remote transmitting unit.

FIG. 5 shows how, with a given input, the logic of the RTU controller changes the state of an existing entry, or adds a new entry to a list (table) of entries for transmission depending on the source of the input (dial-up or RF), step 50, the state of a saved entry, and whether there is a change in command for that entry.

In step 52, a new entry is dialed in. The new entry is added to the list of entries, and the state flag is set to "3". Step 54 shows an entry dialed in for an existing entry. The new dialed-in entry replaces the old entry whether or not the command is the same, and whether or not the previous input was RF or dial-in. For example, if there were an Activation entry for unit 1234567, and a De-activation command is dialed-in for the same unit, 1234567, the Activation entry would be replaced by the dialed-in De-Activation entry. The state flag is set to "3".

Step 56 shows an RF input when there is no previous input for that code. The new code is added to the entry list. The state flag is set to "1" because it is the first entry for that code. Step 58 shows an RF input where the command (Activate or Deactivate) is different from the command in the entry list. If the command is different, the logic treats the input as a new entry, removes the old entry, and sets the state flag to "1".

Step 60 shows an RF input where there is an existing entry with a state flag of "1" and with the same command. The state flag is set to "2". This indicates that a second RF valid entry with the same command and the same code has been received. The system will transmit on the determined schedule if a unit has a state flag of "2" or "3".

Step 62 shows additional RF input for an entry that matches the same command and the same code. These entries are ignored, and the system continues to transmit on schedule. Maintaining very simple state information allows the system to automatically validate and transmit on schedule messages from either RF or dial-in sources.

The "sunset rule" referred to above, implemented by the RTU controller, limits the adverse effects of repeating transmissions based on RF input. In one specific implementation, at midnight GPS time (about sunset Eastern U.S. time) the state flag is changed for every entry in the BIN file. If the state=3 (Dial-up input), then keep the state the same. If the state=1 (1 RF input, do not transmit), then the entry is discarded. If the state=2 (2 RF inputs, transmit on schedule), then the state is changed to 1.

The effect of these state changes is that garbage is discarded, and a fresh input from a dial-up source is required for the transmissions to continue after sunset, which is the next day GPS time. This rule limits the time that an RTU listens for the second RF input by discarding any single inputs at sunset. This rule also prevents garbage from transmitting when two identical garbage messages have been heard. It removes any old activation transmissions, in case a tower did not hear the de-activation signal. The sunset rule keeps the state of the RF repeated messages healthy.

Figure 6:
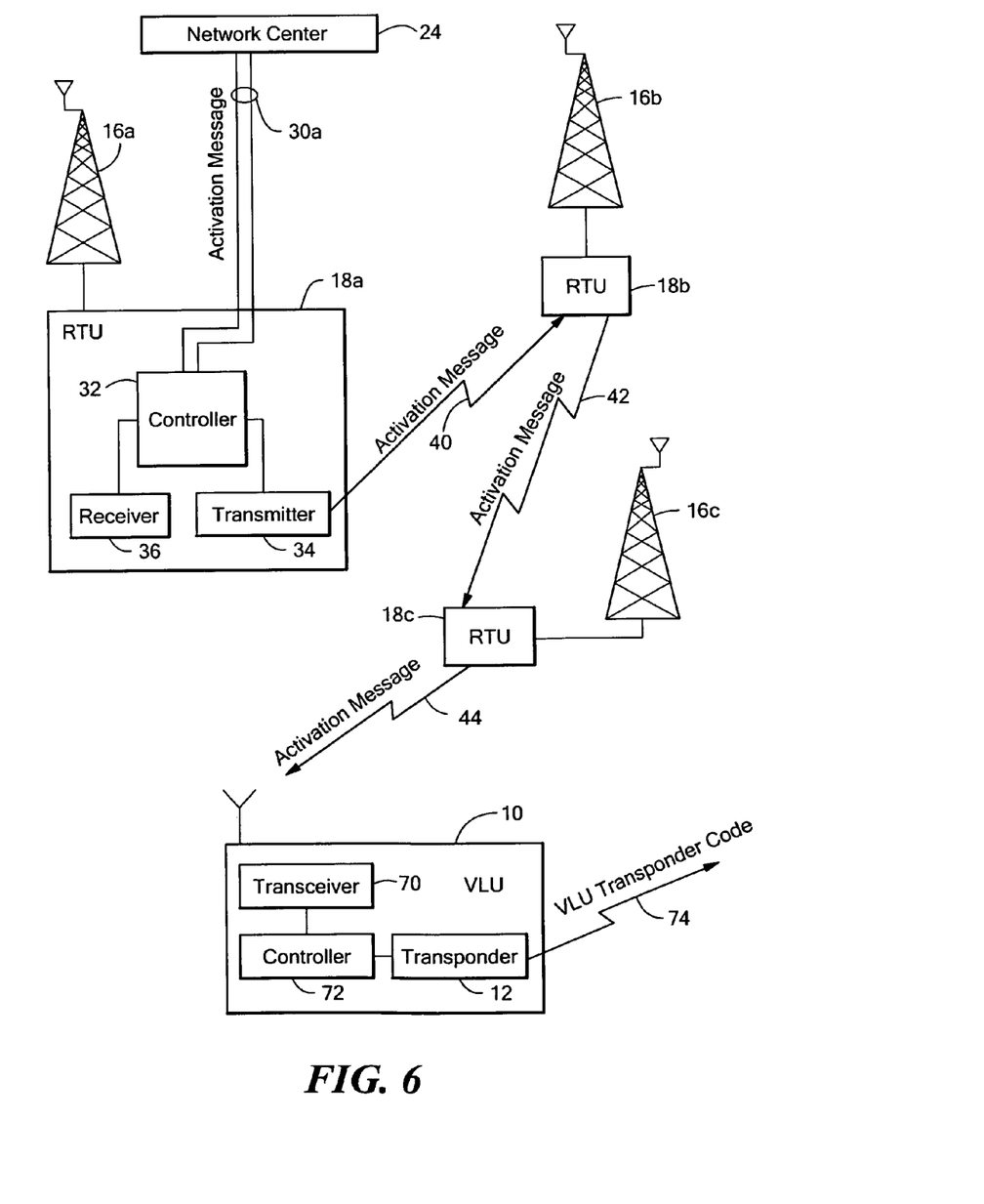
FIG. 6 is a schematic diagram showing an example of recovery system and method with both repeating communication and de-queue logic capabilities in accordance with the subject invention in configuration where an activation message is being transmitted by the remote transmitting units to a vehicle locating unit.

FIG. 6 shows an example where the message sent from the center 24 to the called or primary RTU 18a and from RTU 18a to secondary RTUs 18b and 18c are all an activation message for a particular VLU 10 in response to a theft event involving a vehicle equipped with VLU 10.

The activation message received by transceiver 70 (or a separate receiver and transmitter) of VLU 10 includes a VLU identifier and an activation code. Controller 72 of VLU 10 determines whether its identifier is a match and, if so, activates transponder 12 to transmit a VLU transponder code as shown at 74 to be received by law enforcement vehicle 20, FIG. 1.

As described above, RTU 18a receives the activation message from center 24 and transmits activation message 40. RTU 18b receives the activation message wirelessly and re-transmits it as well. RTU 18c also wirelessly receives the activation message either from RTU 18b and/or RTU 18a and also re-transmits it as shown and so on until the activation message is received by VLU 10. In this way, center 24 need not call secondary RTUs 18b and 18c.

Figure 7:
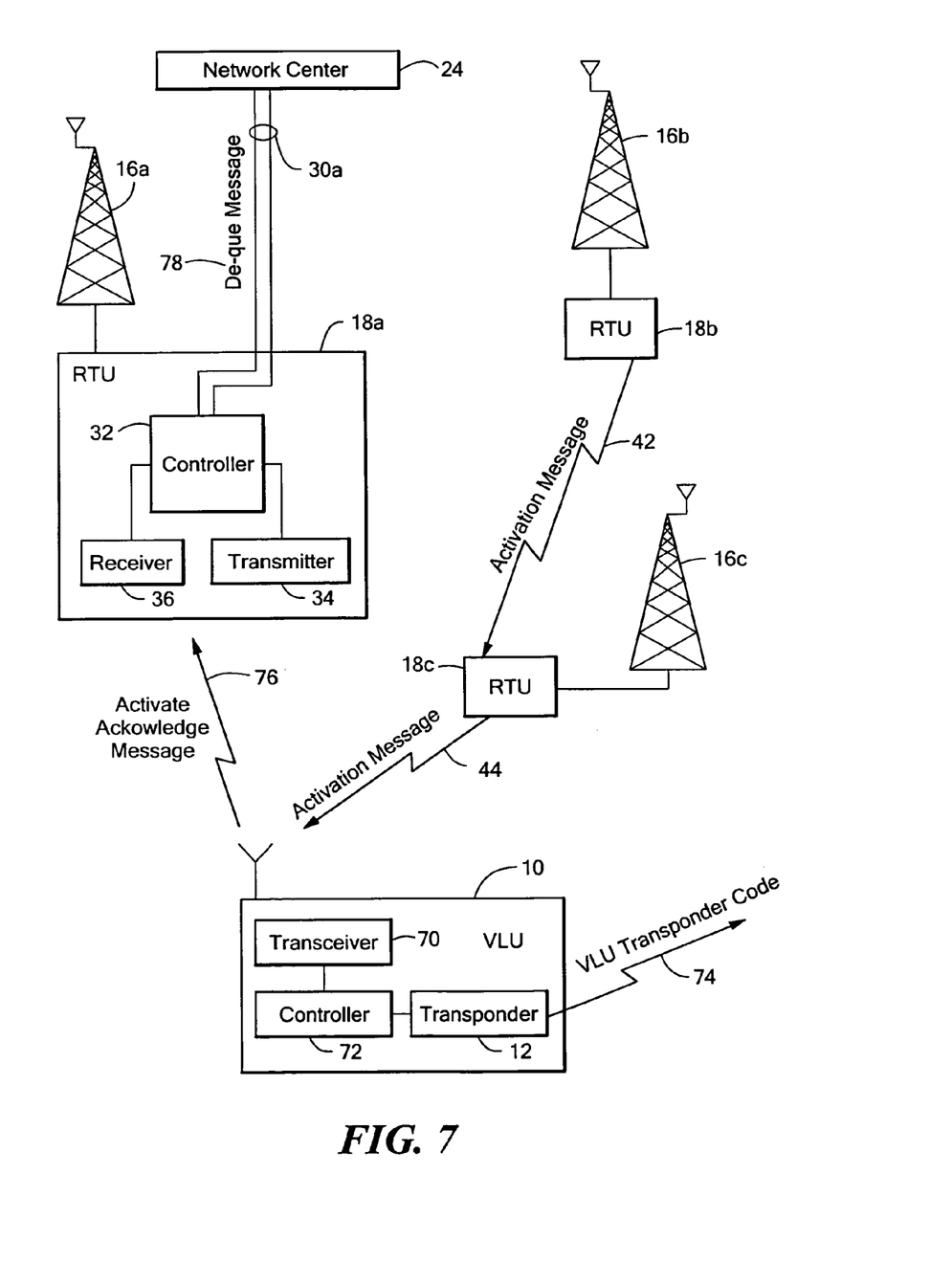
FIG. 7 is a schematic diagram similar to FIG. 6 except now a De-queue message has been transmitted by the network center in response to an activate acknowledgement message transmitted by the vehicle locating unit and showing the scenario where the primary remote transmitting unit has ceased transmitting the activation message in response.

As shown in FIG. 7, controller 72 of VLU 10 now transmits an activation acknowledgement message as shown at 76 ultimately received at center 24 typically via RTUs 18a, 18b, and/or 18c. Once network center 24 receives this message, it transmits a de-queue message as shown at 78 received by RTU 18a. In response to de-queue message 78, controller 32 of RTU 18a ceases transmission of the transponder activation message.

But, the de-queue message cannot be transmitted wirelessly from RTU 18a to RTUs 18b or 18c and thus RTUs 18b-18c would continue to transmit the transponder activation message as shown in FIG. 7 causing needless airwave transmissions unless additional steps are taken.

Figure 8:
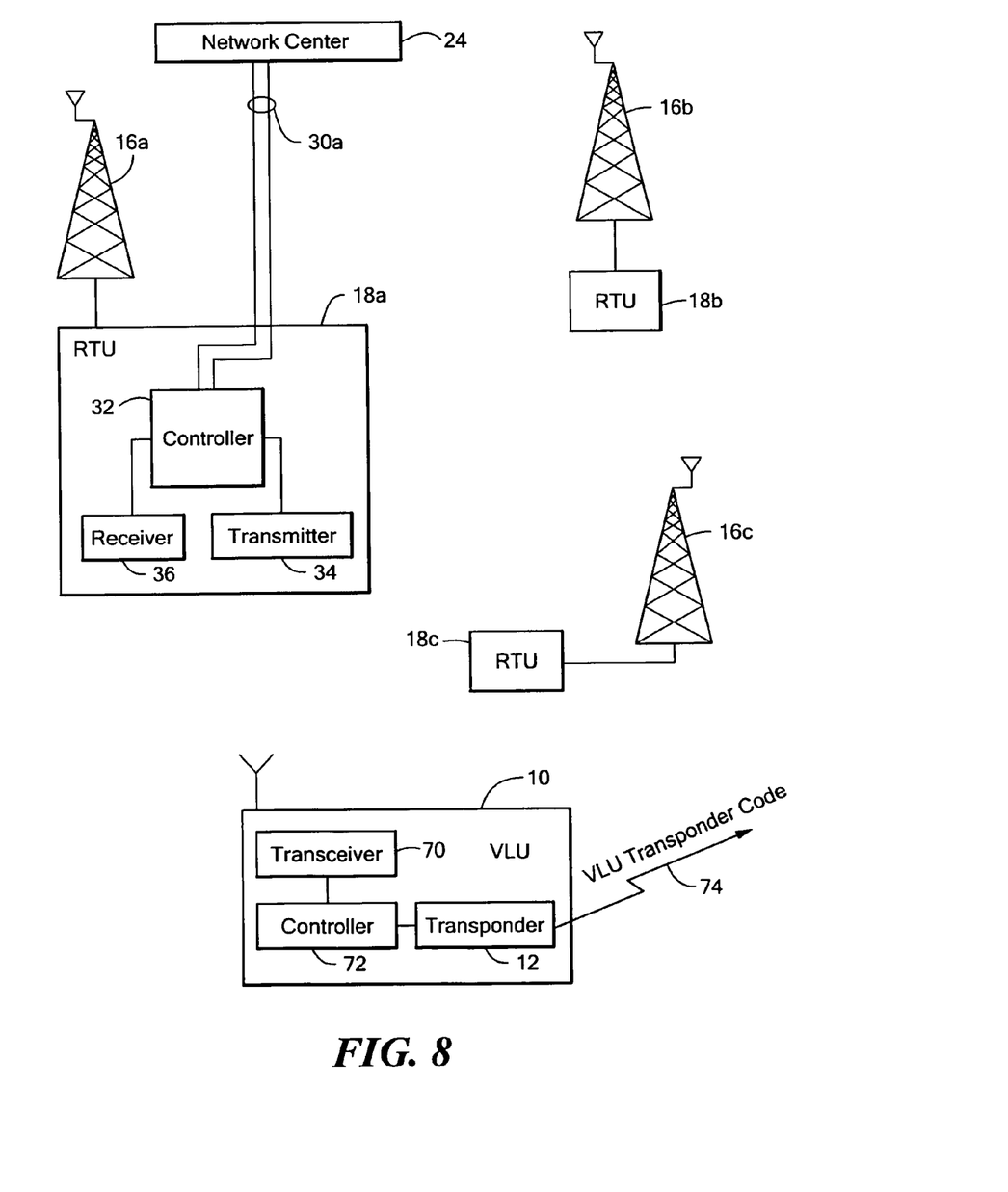
FIG. 8 is a schematic diagram similar to FIG. 7 except now the secondary remote transmitting units have ceased transmitting activation messages in accordance with the subject invention.

In the subject invention, the controllers of RTUs 18b and 18c (and all secondary RTUs) are programmed to transmit the transponder activation message only for a predetermined time period (such as five hours) unless an activation message is again received again by the RTU. In FIG. 8, due to the de-queue message received by RTU 18a, it has ceased transmitting the transponder activation message and now the predetermined time period has expired so RTUs 18b and 18c stop transmitting the activation message. VLU 10 still transmits its VLU transponder code as shown at 74 until the vehicle is recovered in which case center 24 is notified and sends a deactivation message received by VLU 10 via RTUs 18a, 18b, 18c, and the like. Controller 72 of VLU 10 then controls transponder 12 to cease transmitting the VLU transponder code.

Figure 9:
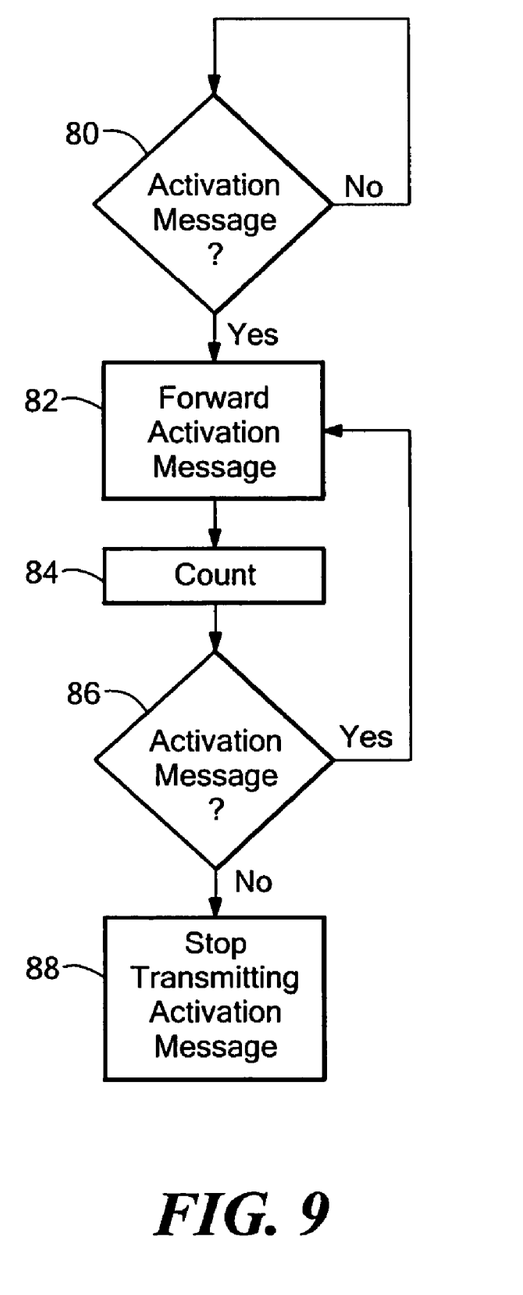
FIG. 9 is a flow chart depicting the primary steps associated with the programming of the controllers of the secondary remote transmitting unites shown in FIGS. 6-8.

The controllers of the secondary "listening" RTUs (RTUs 18b and 18c, FIGS. 6-8) are thus programmed to process transponder activation messages received wirelessly by their respective RF receivers, step 80, FIG. 9. Each such RTU controller then forwards the activation message via its respective transmitter, step 82. After a predetermined time period, step 84, if no new activation message is received, step 86, the RTU controller stops transmitting the activation message, step 88, to clear the airwaves of unnecessary transmissions.

Figure 10:
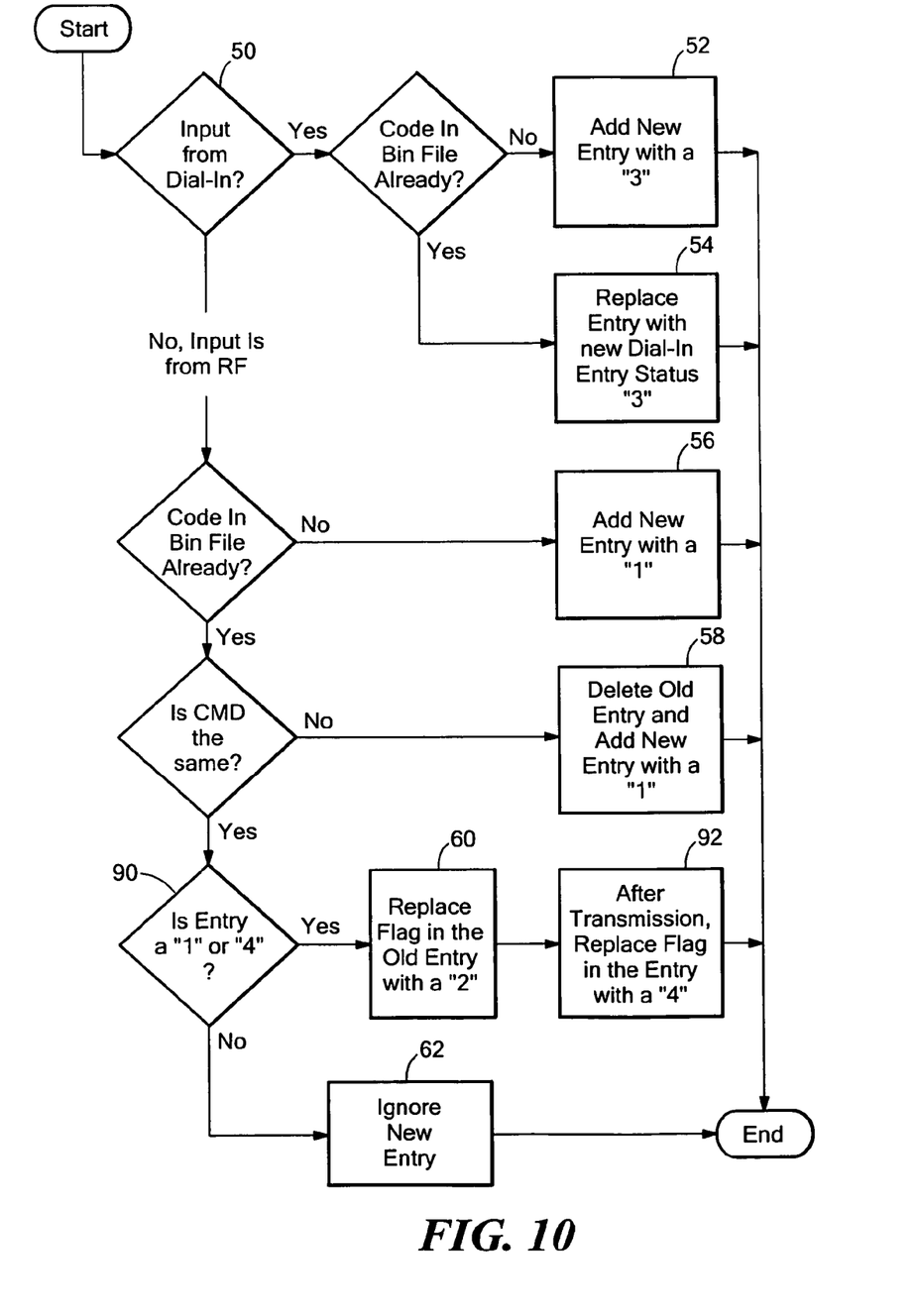
FIG. 10 is a logic flow diagram for the programming of a remote transmitting unit in accordance with the de-queue logic of this invention.

FIG. 10 shows how, with a given input, the logic of the RTU controller changes the state of an existing entry, or adds a new entry to a list (table) of entries for transmission depending on the source of the input (dial-up or RF), step 50, the state of the saved entry, and whether there is a change in command for that entry. The difference between FIG. 5 and FIG. 10 is the addition of logic at decision point 90 and step 92. This new logic creates a new state-4, which is the "Post Transmission State" state. A state-4 entry does not transmit. If a new RF input occurs for an entry at state-4, the state is changed back to state-2 at step 60, and the transmission schedule continues. After transmission, the state is returned to state-4. In this way, when a seed tower's entry (state-3) is de-queued all towers will go quiet for this particular activation entry. With the seed tower entry de-queued, the repeating towers will not transition this entry to the transmitting state, and the entries are eventually dropped from the list (table) entirely. The De-Queue logic thus significantly reduces the number of activation transmissions when a vehicle location unit (VLU) has reported to the network center that it has already activated. Without this logic, the activation transmissions would continue on schedule until sunset (midnight GPS time), or a deactivation command was received either by dial-in or RF.

Although specific features of the invention are shown in some drawings and not in others, this is for convenience only as each feature may be combined with any or all of the other features in accordance with the invention. The words "including", "comprising", "having", and "with" as used herein are to be interpreted broadly and comprehensively and are not limited to any physical interconnection. Moreover, any embodiments disclosed in the subject application are not to be taken as the only possible embodiments. Other embodiments will occur to those skilled in the art and are within the following claims. For example, the system and method described herein may prove useful in other networks and for in systems other than the recovery of valuable objects such as vehicles. And, the system and method described herein may prove useful in vehicle recovery and emergency systems other than the applicant's LoJack® system.

In addition, any amendment presented during the prosecution of the patent application for this patent is not a disclaimer of any claim element presented in the application as filed: those skilled in the art cannot reasonably be expected to draft a claim that would literally encompass all possible equivalents, many equivalents will be unforeseeable at the time of the amendment and are beyond a fair interpretation of what is to be surrendered (if anything), the rationale underlying the amendment may bear no more than a tangential relation to many equivalents, and/or there are many other reasons the applicant can not be expected to describe certain insubstantial substitutes for any claim element amended.

What is claimed is:

1. A recovery system with repeating communication capabilities, the system comprising:
    a station configured to send an activation message;
    at least a first remote transmitting unit responsive to the station and configured to transmit the activation message; and
    at least a second remote transmitting unit including:
        a receiver which receives the activation message,
        a transmitter for transmitting the activation message, and
        a controller responsive to the receiver, controlling the transmitter and programmed to transmit the activation message and then stop transmission of the activation message after a predetermined time period unless the activation message is again received by the receiver.

2. The system of claim 1 in which the locating unit is configured to transmit an activation acknowledgement message in response to the activation message.

3. The system of claim 2 in which the station is configured, in response to the acknowledgement message, to transmit a de-queue message.

4. The system of claim 3 in which the first remote transmitting unit, in response to the de-queue message, is configured to cease transmission of the activation message and then, after the predetermined time period, the second remote transmitting unit ceases transmission of the activation message.

5. The system of claim 2 in which the first remote transmitting unit includes an RF transmitter for sending the activation message to the receiver of the second remote transmitting unit.

6. The system of claim 1 in which said first remote transmitting unit includes a land line connection to the station for receiving the activation message.

7. The system of claim 1 in which the controller is programmed to ignore a message received by the receiver below a predetermined signal strength.

8. The system of claim 1 in which there are N second remote transmitting units each including: a receiver which receives said messages, a controller which processes said messages, and a transmitter which transmits said messages.

9. The system of claim 8 in which there are M first remote transmitting units.

10. The system of claim 9 in which M is less than N.

11. The system of claim 1 in which the activation message is a transponder activation message.

12. A recovery system comprising:
    a vehicle locating unit including:
        a receiver,
        a controller responsive to the receiver,
        a transponder activated by the controller in response to a transponder activation message received by the receiver, and
        a transmitter controlled by the controller for transmitting an acknowledgement message in response to transponder activation;
    a station configured to send the transponder activation message in response to a theft event and a de-queue message in response to receipt of the acknowledgement message;
    at least a first remote transmitting unit responsive to the central station and configured to transmit the transponder activation message until the de-queue message is received from the station; and
    at least a second remote transmitting unit including:
        a receiver which receives the transponder activation message from the first remote transmitting unit,
        a transmitter, and
        a controller responsive to the receiver, and configured to control the transmitter to transmit the transponder activation message and then stop transmission of the transponder activation message after a predetermined time period unless the activation message is again received by the receiver.

13. A vehicle recovery system comprising:
    a vehicle locating unit configured to process an activation message and transmit an acknowledgement message in response;
    a station configured to send the activation message in response to a theft event and a de-queue message in response to receipt of the acknowledgement message;
    at least a first remote transmitting unit responsive to the station and configured to transmit the activation message until the de-queue message is received from the station; and
    at least a second remote transmitting unit configured to receive the activation message from the first remote transmitting unit and to re-transmit the activation message but only for a predetermined time period unless the activation message is again received.

14. A recovery method comprising:

transmitting an activation message from a station to at least a first remote transmitting unit;

the first remote transmitting unit transmitting the activation message in response; and a second remote transmitting unit receiving the activation message at a receiver from the first remote transmitting unit and, in response, transmitting the activation message from a transmitter but only for a predetermined time period unless the activation message is again received by the receiver.

15. The method of claim 14 in which said first remote transmitting unit includes a land line connection to a station for receiving the activation message and transmissions from the first remote transmitting unit and the second remote transmitting unit are wireless.

16. The method of claim 14 in which the activation message is a transponder activation message.

17. A transmission scheduling method for a recovery system including at least one vehicle locating unit, a station, at least a first remote transmitting unit responsive to the station, and at least one second remote transmitting unit responsive to the first remote transmitting unit, all configured to receive, process, and transmit messages, the method comprising:

in the vehicle locating unit, processing an activation message received and transmitting an acknowledgement message in response;

in the station, sending the activation message in response to a theft event and a de-queue message in response to receipt of the acknowledgement message;

in the first remote transmitting unit, transmitting the activation message in response to receipt of the activation message from the station until the de-queue message is received from the station; and in the second remote transmitting unit, receiving the activation message from the first remote transmitting unit and re-transmitting the activation message but only for a predetermined time period unless the activation message is again received.

\* \* \* \* \*